United States Patent [19]
Jaszka

[11] 3,950,500
[45] Apr. 13, 1976

[54] METHOD OF PRODUCING CHLORINE DIOXIDE

[75] Inventor: Daniel J. Jaszka, Tonawanda, N.Y.

[73] Assignee: Hooker Chemicals & Plastics Corporation, Niagara Falls, N.Y.

[22] Filed: Jan. 21, 1975

[21] Appl. No.: 542,759

[52] U.S. Cl. .............. 423/480; 423/472; 423/499; 423/500
[51] Int. Cl.² C01B 11/02; C01B 11/10; C01B 7/02; C01D 3/04
[58] Field of Search ............................ 423/480, 478

[56] References Cited
UNITED STATES PATENTS

| | | | |
|---|---|---|---|
| 2,481,240 | 9/1949 | Rapson | 423/480 |
| 2,598,087 | 6/1952 | Wayman | 423/480 |
| 2,710,246 | 6/1955 | Marks | 423/480 |
| 2,895,801 | 7/1959 | Northgraves et al. | 423/480 |
| 3,864,457 | 2/1975 | Hoekje et al. | 423/480 |

*Primary Examiner*—Edward Stern
*Attorney, Agent, or Firm*—Peter F. Casella; William J. Crossetta, Jr.

[57] ABSTRACT

Chlorine dioxide is produced by the reaction of sodium chlorate with sulfur dioxide in the presence of gaseous chlorine.

3 Claims, No Drawings

METHOD OF PRODUCING CHLORINE DIOXIDE

This invention relates to the production of chlorine dioxide. More particularly, this invention relates to a process for producing chlorine dioxide by the reaction of alkali metal chlorate with sulfur dioxide.

It is known in the art to produce chlorine dioxide by the reaction of sulfur dioxide and an aqueous solution containing an alkali metal chlorate. Such processes as have been available, however, have been less than totally satisfactory. For example, the efficiency of operation and conversion, generally may be on the order of about 58 percent. Increasing reactants, particularly alkali metal chlorate results in unacceptable salt crystallization in the reactor, particularly in the lower portions of columns utilized in effecting the reaction wherein, e.g., sodium chlorate is fed in at the top of the column and gaseous sulfur dioxide diluted with nitrogen is fed countercurrently.

It is an object of the present invention to provide a process for the production of chlorine dioxide wherein the problems existant with prior art techniques are obviated.

In accordance with the present invention, relatively low concentration sodium chlorate is reacted countercurrently with a reactive stream containing chlorine and sulfur dioxide in a packed column.

When gaseous sulfur dioxide is brought into contact with an aqueous solution of sodium chlorate, chlorine dioxide is produced in accordance with the following equation.

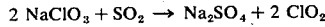
$$2\ NaClO_3 + SO_2 \rightarrow Na_2SO_4 + 2\ ClO_2$$

It has now been found that the production of chlorine dioxide may be efficiently effected by passing an aqueous solution of dilute sodium chlorate of a concentration of from about 30 percent to up to about the saturation point of sodium chlorate in water, in countercurrent flow to diluted sulfur dioxide and gaseous chlorine in a packed column, the sulfur dioxide fed at a rate of from about 1.25:1 to about 1.5:1, based on the moles of sodium chlorate feed, and the gaseous chlorine fed at a rate of from about 0.5:1 to about 0.75:1 on a molar basis, based on the moles of sodium chlorate fed to the packed column reactor.

The sulfur dioxide may be fed to the reactor in any diluent which is non-reactive under the conditions utilized, such as nitrogen. While the percentage of dilution may vary greatly, it has been found that 15 percent sulfur dioxide in nitrogen functions in a preferred manner in the present process.

Such process surprisingly results in approximately a 10–16 percent increase in efficiency over reactions utilizing only sodium chlorate and sulfur dioxide, and permits of the use of sodium chlorate in relatively low concentrations, on the order of about 40 percent by weight, obviating crystal formation and plugging of reaction apparatus during prolonged periods of use.

While apparatus of any design suitable to effect the reaction may be employed, it has been found that packed tower chlorine dioxide generators having an inlet approximately halfway of the height of the packed column for the introduction of gaseous chlorine are particularly well suited for the reaction, with the sulfur dioxide inlet located near the bottom of the column, an inlet near the top of the column for the aqueous sodium chlorate feed, and the takeoff means for both the gaseous and solid reaction products. Generally, the ratio of the height of the tower to the diameter of the tower can be that found suitable to maximize the reaction; ratios of 24:1 to about 30:1 have been found to be acceptable.

The reaction zone in the column lies upstream of the gaseous chlorine inlet and is a relatively short zone. The reactants are fed at such rates as are necessary to develop and maintain an acidity of from 9 to 10 normal in this zone. Preferably, the flow rates are adjusted so that the molar ratio of sulfur dioxide to sodium chlorate is about 1.35:1 and the molar ratio of chlorine to sodium chlorate is about 0.6:1.

The packing utilized in the reaction column can be any commercially available packing of suitable material, such as Raschig rings, verl saddles, glass beads or the like. Preferably, Raschig rings or verl saddles are used.

The reaction is conducted at a temperature of about 60° centigrade, with external cooling as required to maintain the reaction zone at this temperature. The temperature of the uppermost portion of the column generator is generally on the order of about 20° to about 30° centigrade, allowing for the effective absorption of generated hydrogen chloride. The lower portion of the column is increasingly cooler than 60° centigrade.

The reaction is conducted on a bath or continuous basis, preferably on a continuous basis by proper adjustment of feed rates. The selection of the rates, dependent upon the apparatus employed, the rate of reaction desired, and the like, which selection will be within the skills of those practitioners of the art.

Examples 2–3 following are indicative of the results achieved when reacting sodium chlorate and sulfur dioxide, without chlorine, in producing chlorine dioxide.

EXAMPLE 1

A glass column having a height of approximately 30 inches and an inside diameter of one inch was packed with ⅛ inch diameter glass helices, and pre-wetted with 40 percent aqueous sodium chlorate solution. Aqueous 40 percent sodium chlorate flow was adjusted so that 0.325 mole of sodium chlorate was utilized in the reaction. Immediately, sulfur dioxide addition was initiated (15 percent, diluted with nitrogen) to a total feed of 0.55 mole, the rate of addition such as to control the reaction zone approximately midway the height of the column. Under these operating conditions, the acid effluent was colorless in the lower portion of the column reactor, indicating complete utilization of the sodium chlorate. The temperature of the hot or reaction zone was approximately 60° centigrade and was approximately 3 inches long.

On achieving equilibrium conditions, the gas stream emanating from the column reactor was continuously scrubbed with a solution of caustic and hydrogen peroxide, converting all chlorine dioxide generated to sodium chlorite and chlorine and hydrogen chloride into sodium chloride, for analytical purposes, with acid effluent collected analyzed for acidity and chlorate content.

Under these operating conditions, with a sulfur dioxide; sodium chlorate ratio of 1.57:1, 0.208 mole of chlorine dioxide and 0.01 mole of chlorine were produced with an efficiency of 58.5 percent. No chlorate was noted in the acid effluent, with 0.80 mole of acid therein. Salt formation in the bottom of the column produced plugging of the lower column.

EXAMPLE 2

Utilizing the operating conditions of Example 1, with 0.88 mole sulfur dioxide and 0.570 mole sodium chlorate feed ($SO_2$:$NaClO_3$=1.54:1) analysis indicated a process efficiency of 54.4 percent, with 0.310 mole chlorine dioxide produced and with complete utilization of the sodium chlorate. Plugging of the lower portion of the reaction column again occurred.

EXAMPLE 3

Utilizing the apparatus and operating conditions of Example 1, with 0.82 mole sulfur dioxide and 0.672 mole sodium chlorate feed ($SO_2$:$NaClO_3$=1.34:1), analysis indicated a process efficiency of 61.8 percent on a yield of 0.418 mole chlorine dioxide and complete utilization of the sodium chlorate. Again, plugging of the lower portion of the reaction column occurred.

The following examples serve to illustrate the process of the present invention.

EXAMPLE 4

Utilizing the process conditions of Example 1, with the exception that the apparatus included a chlorine inlet approximately midway the length of the reaction column, with a 0.82 mole sulfur dioxide, 0.559 mole sodium chlorate and 0.51 mole gaseous chlorine feed ($SO_2$:$NaClO_3$=1.46:1; $Cl_2$:$NaClO_3$=1.1:1), analysis indicated a 73.3 percent process efficiency on a yield of 0.410 mole chlorine dioxide and complete utilization of the sodium chlorate. No plugging of the reaction column was noted.

EXAMPLE 5

Utilizing the apparatus and operating conditions of Example 4 with 0.75 mole sulfur dioxide, 0.460 mole sodium chlorate and 0.21 mole chlorine feed ($SO_2$:$NaClO_3$=1.63:1; $Cl_2$:$NaClO_3$=2.2:1), analysis indicated a 72.5 percent process efficiency on a yield of 0.335 mole chlorine dioxide and complete utilization of sodium chlorate. No plugging of the reaction column was noted.

EXAMPLE 6

Utilizing the apparatus and operating conditions of Example 4, with 0.86 mole sulfur dioxide, 0.570 mole sodium chlorate and 0.27 mole chlorine feed ($SO_2$:$NaClO_3$=1.52:1; $Cl_2$:$NaClO_3$=2.1:1) analysis indicated a 69 percent process efficiency on a yield of 0.390 mole chlorine dioxide and complete utilization of sodium chlorate. No plugging of the reaction column was noted.

EXAMPLE 7

Utilizing the apparatus and operating conditions of Example 4, with a feed of 0.89 mole sulfur dioxide, 0.725 mole sodium chlorate and 0.14 mole chlorine ($SO_2$:$NaClO_3$=1.27:1; $Cl_2$:$NaClO_3$=5.2:1) analysis indicated a 73.4 percent process efficiency on a yield of 0.532 mole chlorine dioxide and complete utilization of sodium chlorate. No plugging of the reaction column was noted.

EXAMPLE 8

Utilizing the apparatus and operating conditions of Example 4, with a feed of 0.82 mole sulfur dioxide, 0.670 mole sodium chlorate and 0.13 mole chlorine ($SO_2$:$NaClO_3$=1.21:1; $Cl_2$:$NaClO_3$=5.1:1) analysis indicated a 73.6 percent process efficiency on a yield of 0.494 mole chlorine dioxide and complete utilization of the sodium chlorate. No plugging of the reaction column.

It is readily seen from the above Examples 1–3 that, in order to produce one pound of chlorine dioxide, 2.4 pounds of sulfur dioxide and 2.7 pounds of sodium chlorate are required. In accordance with Examples 4–8, which serve to illustrate the process of the present invention, only 1.6 pounds of sulfur dioxide, 2.1 pounds of sodium chlorate and 0.3 pound of chlorine are required to produce one pound of chlorine dioxide, with no plugging of the reaction apparatus.

What is claimed is:

1. A process for the production of chlorine dioxide by the reaction of sulfur dioxide and sodium chlorate which comprises the steps of:
   A. passing a stream of aqueous sodium chlorate into a packed reaction column, said stream having a concentration of from about 30 percent by weight to about the saturation point of sodium chlorate;
   B. feeding countercurrently a stream of gaseous sulfur dioxide into the lower portion of said reaction column to contact said sodium chlorate,
   C. feeding a stream of gaseous chlorine into said reaction column at a point near the lower portion of said reaction zone,
   D. said streams having a molar ratios of from about 1.25 to about 1.5:1 sulfur dioxide and from about 0.5 to about 0.75:1 Chlorine, per mole of sodium chlorate,
   E. adjusting the feed ratios of the components so as to maintain an acidity of from about 9 to about 10 normal in a reaction zone in said reaction column,
   F. maintaining a reaction temperature of about 60°C. in said reaction zone,
   G. maintaining a temperature of between about 20° to about 30°C. in the uppermost portion of said reaction column and a temperature of less than 60°C. in the lowermost portion of said reaction column, and
   H. withdrawing a stream of chlorine dioxide from said reaction column.

2. The process of claim 1 wherein the process is a continuous process.

3. The process of claim 1 wherein the sodium chlorate reactant is an aqueous solution of sodium chlorate containing about 40 percent by weight sodium chlorate.

* * * * *